United States Patent [19]

Birchfield et al.

[11] 3,825,842

[45] July 23, 1974

[54] PULSE RATE DISCRIMINATOR GENERATING OUTPUT ONLY AT PREDETERMINED INPUT FREQUENCY

[76] Inventors: Jerry Linward Birchfield, 2204 Tanglewood Rd., Decatur, Ga. 30033; Richard Wallace Moss, 545 W. Sandtown Rd., Marietta, Ga. 30060

[22] Filed: Apr. 18, 1973

[21] Appl. No.: 352,394

Related U.S. Application Data

[62] Division of Ser. No. 176,058, Aug. 30, 1971, Pat. No. 3,757,315.

[52] U.S. Cl................................ 328/138, 328/140
[51] Int. Cl. .............................................. H03k 9/06
[58] Field of Search............................ 328/138, 140

[56] References Cited
UNITED STATES PATENTS

| | | | |
|---|---|---|---|
| 3,466,550 | 9/1969 | Wolf et al. | 328/140 |
| 3,474,341 | 10/1969 | Crafts et al. | 328/140 X |
| 3,550,017 | 12/1970 | Whalen | 328/138 X |
| 3,581,220 | 5/1971 | Bell | 328/140 X |

Primary Examiner—John S. Heyman
Attorney, Agent, or Firm—Browne, Beveridge, DeGrandi & Kline

[57] ABSTRACT

A pulse rate discriminator for generating an output signal only when the input signal thereto is of a predetermined frequency. A delay one-shot multivibrator means is connected to a pulse-generating means which generates first pulses timed with every other axis crossing of the input signal. The delay one-shot multivibrator means generates a delay pulse of pre-set duration which duration is a first predetermined fraction of the period corresponding to said predetermined frequency. A pulse one-shot multivibrator means is connected to the delay multivibrator means for generating second pulses the duration of which are a second predetermined fraction of the period corresponding to said predetermined frequency. An AND gate is connected to the pulse generating means and to the pulse one-shot multivibrator means for generating a coincidence signal each time the first and second pulses coincide and means is provided for detecting the coincidence signals and for generating the output signal only when a predetermined minimum number of the coincidence signals are detected.

13 Claims, 2 Drawing Figures

PULSE RATE DISCRIMINATOR GENERATING OUTPUT ONLY AT PREDETERMINED INPUT FREQUENCY

This application is a division of U.S. Pat. No. 3,757,315, Ser. No. 176,058 filed Aug. 30, 1971.

This invention relates to an improved pulse rate discriminator means which is especially useful in an alarm system, for instance as disclosed in U.S. Pat. No. 3,757,315.

The pulse rate discriminator means of the present invention indicates whether a given frequency is present by comparing the time between negative going zero crossings of the input wave to the discriminator with the duration of a plurality of fixed length pulses generated by pulse-generating means. The pulse rate discriminator means is therefore responsive only to the frequency of the input signal thereto and not to the amplitude of the signal or to the amplitude of any spurious signals and the pulse rate discriminator cannot therefore be triggered by interference signals or by harmonics of the input signal.

It is therefore an object of the invention to provide an improved pulse rate discriminator means which generates an output signal only when a signal of predetermined frequency is present at its input and which is responsive only to the frequency of the input signal and not to the amplitude.

The pulse rate discriminator means of the invention comprises a means for generating pulses at each negative going zero axis crossing of the wave input to the discriminator, said pulse generating means having two outputs, one output of which is connected to an AND gate and the other output of which is connected to two one-shot multivibrators in series. The output of the second one-shot multivibrator is also connected to the input of the AND gate. The coincidence output signals from the AND gate are counted by a pulse counter which is automatically reset by a reset multivibrator if a pulse is missing. A given number of pulses without a missing pulse will fire a Schmitt level detector which charges a charging network when the level detector is in its on state. After a predetermined time the voltage across the charging network will trigger a gated pulse generator which generates the alarm output pulse. I however a coincidence pulse is missing before the charging network has reached the firing voltage of the gated pulse generator the reset multivibrator will operate to turn the Schmitt level detector to the off state which will discharge the charging network. Thus an input signal of predetermined frequency must be present at the input for a predetermined minimum period of time before an output pulse will be generated.

Figure 1:
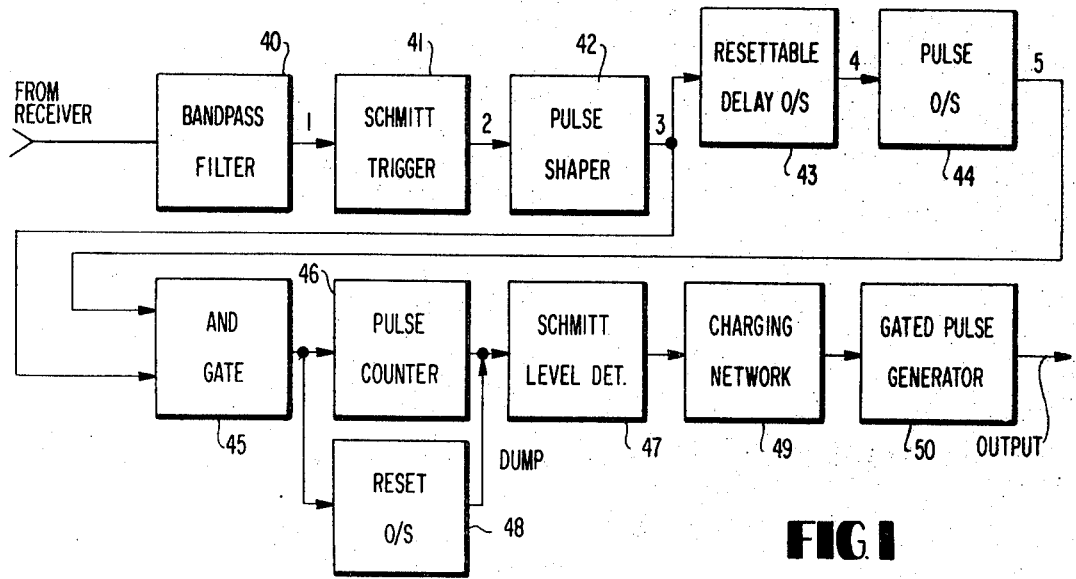
FIG. 1 is a block diagram of the pulse rate discriminator means according to the invention.
Figure 2:
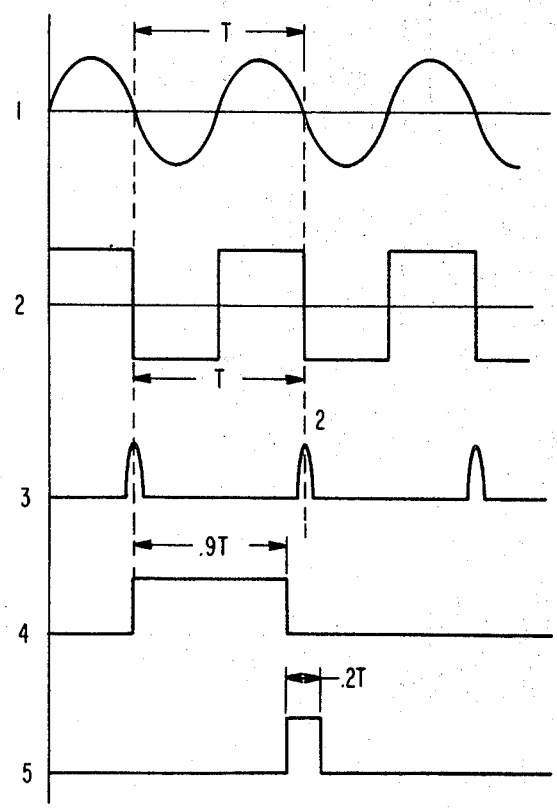
FIG. 2 is a diagram of the waveforms produced by the pulse rate discriminator means of FIG. 1.

A block diagram of a pulse rate discriminator according to the invention is shown in FIG. 1 and waveforms associated therewith are shown in FIG. 2. The bandpass filter 40 at the input serves to reduce the noise which may be present on the input signal. The output of bandpass filter 40 is shown in FIG. 2 at 1 and is a sine wave signal of period T. Schmitt trigger 41 acts as a squaring means on signal 1 to produce the waveform shown at 2 in FIG. 2 which waveform has a negative going edge every time waveform 1 has a negative going axis crossing point. Pulse shaper 42 generates a pulse each time that waveform 2 has a negative going edge. Thus waveform 3 shown in FIG. 2 consists of a series of pulses with period T. One output from pulse shaper 42 is fed to AND gate 45 and the other output is fed to resettable delay one shot multivibrator 43 which generates a delay pulse as shown at 4 in FIG. 2. The resettable delay one-shot 43 operates only if the input pulse rate is less than some preset maximum value.

The duration of delay pulse 43 is a substantial fraction of the duration T. In the preferred embodiment of the invention this fraction is approximately 9/10. The lagging edge of waveform 4 triggers pulse one shot multivibrator 44 which generates a pulse of duration equal to a small fraction of the period T. In the preferred embodiment of the invention this fraction is approximately 2/10.

The other input to the AND gate is the output from pulse one-shot multivibrator 44. If the frequency to which the decoder is responsive is present at the input wave then the pulse generated by pulse shaper 42 immediately following the pulse which has triggered delay one-shot multivibrator 43 will coincide with the pulse output of pulse one-shot 44. Thus as shown in FIG. 2 when the proper frequency is present at the input, pulse 2 of pulse wave 3 coincides with pulse output 5 of pulse one-shot multivibrator 44. The coincidence or noncoincidence of pulse 2 with waveform 5 is determined by AND gate 45.

Pulse counter 46 generates a ramp output the final amplitude of which is determined by the number of pulses counted. When the amplitude of the output of pulse counter 46 reaches a predetermined level Schmitt level detector 47 is triggered into its on state. Schmitt level detector 47 is a standard two state Schmitt device. Reset one-shot multivibrator 49 acts as a missing pulse detector. Thus it is predetermined that a given number of successive outputs from AND gate 45 without a missing pulse is to be indicative that the proper frequency is present. This given number of outputs from AND gate 45 is the number which will bring the output of pulse counter 46 to the level at which Schmitt level detector 47 is triggered to its on state. If, however, a pulse is missing from the successive train of pulses then reset one-shot multivibrator 49 is triggered which dumps the count of pulse counter 46 to zero and it must start counting all over again to indicate the presence of the proper frequency.

According to one feature of the pulse rate discriminator a signal having the proper frequency must be present for at least 100 milliseconds before an output alarm signal will be generated. Hence, when the output of pulse counter 46 reaches a predetermined amplitude Schmitt level detector 47 is turned on. The Schmitt detector will remain in its on state so long as pulse counter 46 keeps on receiving coincidence pulses from AND gate 45 without a missing pulse. As long as Schmitt detector 49 is in its on state charging network 49 charges. At the end of 100 milliseconds network 49 which may be a simple RC network is charged to the point where gated pulse generator 50 to which the RC network is connected, triggers its alarm output signal. If, however, a successive pulse is missing during the 100 milliseconds reset one-shot multivibrator 49 will be operative to return Schmitt level detector 47 to its off state. When this happens charging network 49 discharges and a new 100 millisecond criterion must be met. Thus the alarm output signal will not be generated unless an input wave of proper brequency is present at the input terminals for at least 100 milliseconds.

While I have described and illustrated a preferred embodiment of my invention, I wish it to be understood that I do not intent to be restricted solely thereto, but that I do intend to cover all modifications thereof which would be apparent to one skilled in the art and which come within the spirit and scope of my invention.

We claim:

1. A pulse rate discriminator for generating an output signal only when the input wave signal to the discriminator is of a predetermined frequency comprising, pulse generating means for generating first pulses timed with every other axis crossing of said input wave, delay one shot multivibrator means connected to said pulse generating means for generating a delay pulse of preset duration when triggered by said first pulses, said preset duration being a first predetermined fraction of the period corresponding to said predetermined frequency, pulse one shot multivibrator means connected to said delay multivibrator means for generating second pulses when triggered by said delay pulses, the duration of said second pulses being a second predetermined fraction of the period corresponding to said predetermined frequency, said second predetermined fraction being smaller than said first predetermined fraction, said first and second predetermined fractions adding up to more than one, an AND gate connected to said pulse generating means and to said pulse one shot multivibrator means for generating a coincidence signal each time said first and second pulses coincide, and means for detecting said coincidence signals generated by said AND gate and for generating said output signal only when a predetermined minimum number of said coincidence signals is detected.

2. The pulse rate discriminator of claim 1 wherein said first predetermined fraction is substantially greater than said second predetermined fraction.

3. The pulse rate discriminator of claim 2 wherein said first predetermined fraction is approximately 9/10 and said second predetermined fraction is approximately 2/10.

4. The pulse rate discriminator of claim 1 wherein said delay one shot multivibrator means is a resettable multivibrator means which only operates when the rate of occurrence of said first pulses is less than a predetermined frequency.

5. The pulse rate discriminator of claim 2 wherein said means for detecting said coincidence signals includes a counter means for counting said coincidence signals and a two state detector, said counter means being operative to turn said two state detector to the on state when a predetermined count of said coincidence signal is reached.

6. The pulse rate discriminator of claim 5 further including a dump one shot multivibrator means connected between said AND gate and said pulse counter means for dumping the count of said pulse counter means if the time period between two successive coincidence signals exceeds a predetermined maximum.

7. The pulse rate discriminator of claim 6 wherein said predetermined maximum is approximately 1.5 times the period corresponding to said predetermined frequency.

8. The pulse rate discriminator of claim 6 wherein said pulse counter means generates a ramp output signal, the amplitude of which is proportional to the number of coincidence signals counted and wherein said two state detector is a level detector which turns to the on state when said ramp output signal exceeds a predetermined level.

9. The pulse rate discriminator of claim 6 wherein said two state level detector is connected to a charging network which is connected to an output pulse generator means, said charging network being charged when said two state detector is in the on state and said output pulse generator means being operative to generate said output pulse when the voltage across said charging network reaches a given minimum value.

10. The pulse rate discriminator of claim 9 wherein said dump one shot multivibrator means is also connected to said two state level detector for turning said level detector to the off state if the time period between said coincidence signals exceeds a predetermined maximum.

11. The pulse rate discriminator of claim 10 wherein the time constant of said charging network is approximately 100 milliseconds.

12. The pulse rate discriminator of claim 11 wherein said two state level detector is a Schmitt detector.

13. The pulse rate discriminator of claim 11 wherein said pulse generating means for generating said first pulses includes a Schmitt trigger means and a pulse shaper means.

* * * * *